United States Patent Office 3,776,988
Patented Dec. 4, 1973

3,776,988
CRYOCHEMICAL METHOD FOR FORMING SPHERICAL METAL OXIDE PARTICLES FROM METAL SALT SOLUTIONS
Marvin C. Tinkle, Los Alamos, N. Mex., assignor to the United States of America as represented by the United States Atomic Energy Commission
No Drawing. Filed Aug. 13, 1971, Ser. No. 171,745
Int. Cl. B01j 2/06
U.S. Cl. 264—14                               1 Claim

ABSTRACT OF THE DISCLOSURE

A method of preparing small metal oxide spheres cryochemically utilizing metal salts (e.g., nitrates) that cannot readily be dried and calcined without loss of sphericity of the particles. Such metal salts are cryochemically formed into small spheres, partially or completely converted to an insoluble salt, and dried and calcined.

BACKGROUND OF THE INVENTION

The invention described herein was made in the course of, or under, a contract with the U.S. Atomic Energy Commission. It relates to a method of forming spherical metal oxide particles through freeze drying, utilizing as a starting material salts that cannot readily be dried and calcined without loss of sphericity of the particles.

Various metal oxide microspheres are useful for nuclear reactor purposes, as insulator materials, or as catalysts. It is frequently highly desirable that these microspheres be as nearly spherical as possible and that the sphericity be uniform from one particle to the next. An advantageous technique for the production of spherical metal oxide particles makes use of freeze drying. The use of cryochemical techniques such as freeze drying in the formation of small metal oxide spheres is old in the art. They have been applied to the production of spheres of alumina, magnesia, thoria, etc., as well as of homogeneous ferrites, garnets, and other ceramics.

As disclosed by Monforte et al. in U.S. Pat. 3,551,533 issued Dec. 29, 1970, freeze drying of an atomized liquid solution results in a variety of useful end products, both with regard to structure and to composition. In accordance with the procedure a solution of the desired solute material is broken up into fine droplets by any of a variety of techniques. The droplets are rapidly frozen so as to prevent substantial coalescence and the solvent is removed by sublimation. Because the liquid droplets quickly assume a spherical configuration, the frozen droplets, initially at least, also have this configuration.

Because most metal oxides are essentially insoluble in water and many other solvents, it is necessary to render them soluble by converting them to corresponding salts such as sulfates, carbonates, nitrates, nitrites, chloride, etc. which are then placed in solution, formed into droplets, frozen, and vacuum dried. The salts used must be capable of yielding the desired composition after drying, either through thermal decomposition or chemical reduction reaction.

A problem heretofore with the application of cryochemical techniques such as those disclosed by Monforte et al. to the production of metal oxide spheres has been that only certain salts would produce spheres on calcining. These salts, e.g., sulfates, are not necessarily the most water soluble salts or the easiest to work with. A more preferable salt for many metals is the nitrate which is quite soluble and easily formed. But metal nitrate particles have a strong tendency to slump or otherwise deform during the drying or calcining steps.

SUMMARY OF THE INVENTION

The problem of slumping or deformation of metal nitrate particles prior to or during calcining can be avoided by converting the nitrate either partially or completely to an insoluble salt after freezing but before the calcining step. The particles of the insoluble salt have essentially the same sphericity as that of the nitrate and retain this sphericity during calcining.

It should be noted that Bowman et al. in U.S. Pat. 3,422,167 issued Jan. 14, 1969, disclose a process for preparing metal oxide spheres of Al, Eu, Hf, Pu, Th, U, and mixtures thereof by preparing a hydrous oxide sol, forming particles thereof, freeze drying the particles, and calcining. This process, however, is substantially different than that of the present invention.

DESCRIPTION OF THE PREFERRED EMBODIMENTS

Uranyl nitrate solution is streamed into a vortex of stirred hexane chilled in a Dry Ice-acetone bath. The solution freezes into small, spherical particles which are removed from the hexane and freeze dried. Because uranyl nitrate particles cannot be converted directly to oxide without slumping, the freeze dried particles are then dropped into $NH_4OH$ and converted to insoluble ammonium diuranate (ADU) particles. The ADU principles are then separated from the $NH_4OH$, dried in an oven, and calcined to uranium oxide.

Alternatively, this approach can be used for handling particles that cannot even be freeze dried without losing spherical character. Frozen particles of $Th(NO_3)_4$ solution or $Th(NO_3)_4$-$UO_2(NO_3)_2$ solution are dropped into concentrated $NH_4OH$ immediately after removal from the hexane. The outside of the particles reacts to form a capsule preserving the size and shape of the particular particle. The inside is still liquid, but the capsules are sufficiently rigid to allow gentle handling. The particles are then dried (in oven or vacuum) and retain their spherical shape. The dried particles are essentially hollow spheres and can be calcined with no significant change in shape, especially if they are given an additional $NH_4OH$ treatment after drying.

The preferred concentration for the soluble metal salt solution to be spheroidized and dried is about 1 M. As the concentration is increased to 2 M, there is greater tendency for the particles to agglomerate or otherwise stick together. Above about 2 M salt concentrations, the particles no longer remain separate but combine to form a taffy-like mass. As the concentration is increased above 2 M there is also an increased difficulty in forcing the more syrup-like solution through the streaming nozzle. In concentrations of less than 1 M the $NH_4OH$-treated particles tend to be more fragile, and below about 0.5 M concentrations the particles are not well formed. However, readily usable, albeit less dense, particles are easily obtained using 0.5 M soluble metal salt as the feed solution.

Although the examples that follow are limited to the use of nitrates as the feed solution, satisfactory hollow spherical particles are also obtained if 1 M $UO_2Cl_2$ is used as the feed.

Example I

Spherical uranium oxide particles having sizes of 500 to 1000 microns are prepared as follows. One hundred ml. of a 1 M $UO_2(NO_3)_2$ solution is streamed into about 750 ml. of stirred hexane contained in a 1-liter copper beaker chilled in a Dry Ice-acetone bath. The solution is streamed at a flow rate of about 16 to 36 ml./min. from a 20-mil-diameter nozzles. Reducing the molarity of the feed solution produces less dense particles. The resulting frozen spherical particles are separated from the hexane by vacuum filtration using a Buchner funnel and coarse filter paper and then transferred to a freeze dryer where they are freeze dried starting at $-40°$ C. The freeze dried particles are then placed in 7.5 N $NH_4OH$, allowed to stand for 10 minutes, removed by filtration, and dried (in oven or vacuum). The resulting spherical ammonium diuranate particles are then either calcined to $U_3O_8$ or directly reduced to $UO_2$ in flowing $H_2$. In either case the particles retain their spherical character.

Example II

Hollow spherical thorium oxide, uranium oxide, or mixed Th-U oxide particles with sizes in the range of 500 to 1000 microns are prepared as follows. Depending on which oxide is desired, the soluble metal salt used as the feed solution may be 1 M $Th(NO_3)_4$, 1 M $UO_2(NO_3)_2$, or 1 M (metal ion) $Th(NO_3)_4$-$UO_2(NO_3)_2$. The feed is streamed into about 750 ml. of stirred hexane chilled in a Dry Ice-acetone bath. The streaming is through a 20-mil-diameter nozzle at about 16 to 36 ml./min. The resulting frozen spherical particles are separated from the hexane by vacuum filtration using a Buchner funnel and coarse filter paper and then quickly placed in 15 N $NH_4OH$ and allowed to stand for 10 minutes. Depending on the feed salt used, either $Th(OH)_4$, $(NH_4)_2U_2O_7$, or $Th(OH)_4$-$(NH_4)_2U_2O_7$ jacketed particles are produced. These particles are then separated from the $NH_4OH$ by filtration and dried in oven or vacuum. After drying, the particles are placed in 7.5 N $NH_4OH$ for 10 minutes and once again separated by filtration and dried. The particles are then calcined to produce the oxide. Calcining for 10 hr. at $1000°$ C. converts the $Th(OH)_4$ to $ThO_2$. Mixed $Th(OH)_4$-$(NH_4)_2U_2O_7$ can be calcined to Th-U mixed oxides. If $ThO_2$-$UO_2$ is the desired oxidation state, the $Th(OH_4)$-$(NH_4)_2U_2O_7$ can be reduced in flowing $H_2$.

What I claim is:

1. A method of forming metal oxide spheres from frozen particles of an actinide metal nitrate salt solution, said actinide metal being selected from the group consisting of uranium and thorium and mixtures thereof, comprising:
   (a) atomizing said solution to form spherical droplets;
   (b) freezing said droplets to form spherical particles thereof by streaming said droplets into a vortex of stirred chilled hexane at a temperature below the freezing point of said actinide nitrate solution;
   (c) contacting said resulting frozen spherical particles with ammonium hydroxide to convert said metal salt therein to insoluble metal salt particles;
   (d) freeze drying said frozen spherical particles of said insoluble metal salt;
   (e) further drying said frozen spherical particles in an oven;
   (f) contacting said dried spherical particles with 7.5 N ammonium hydroxide; and
   (g) drying and calcining said spherical particles.

References Cited

FOREIGN PATENTS

| | | | |
|---|---|---|---|
| 3,607,753 | 9/1971 | Suchoff | 264—28 |
| 3,551,533 | 12/1970 | Montforte | 264—14 |
| 3,422,167 | 1/1969 | Bowman | 264—15 |

ROBERT F. WHITE, Primary Examiner

J. R. HALL, Assistant Examiner

U.S. Cl. X.R.

264—28